May 27, 1924.
T. M. FINLEY
HEATING SYSTEM FOR FLYING MACHINES
Filed April 3, 1919  4 Sheets-Sheet 2
1,495,897
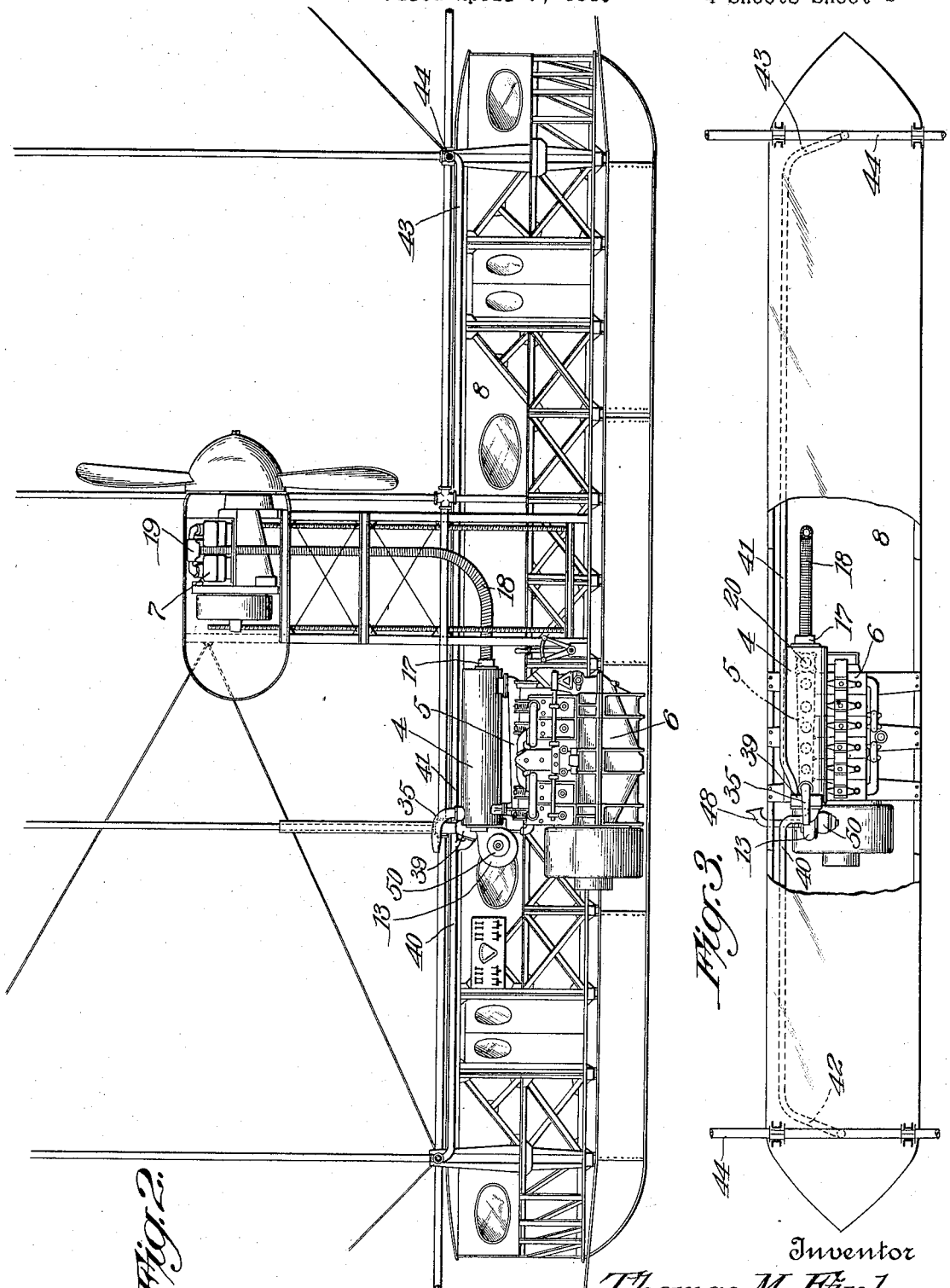

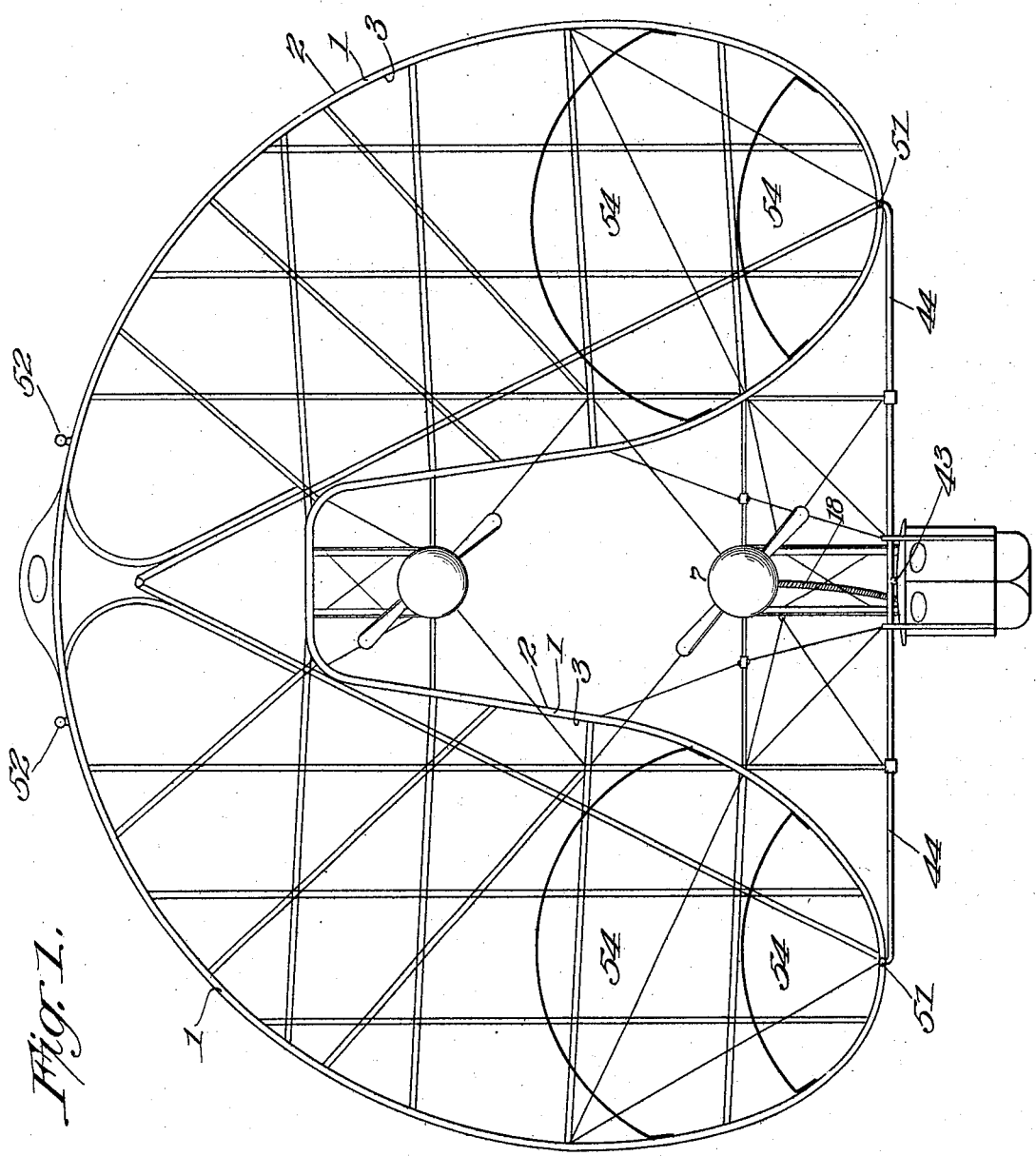

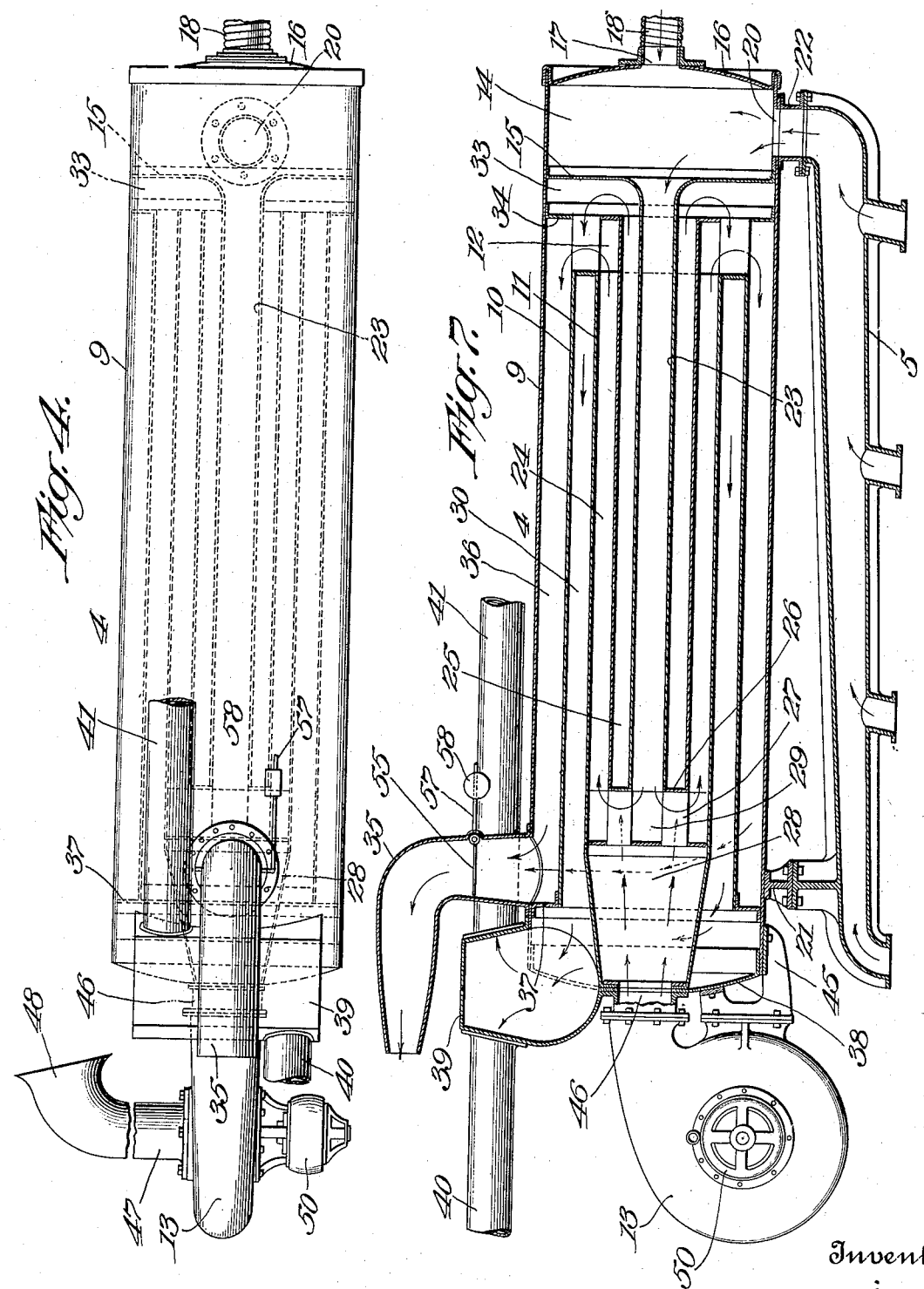

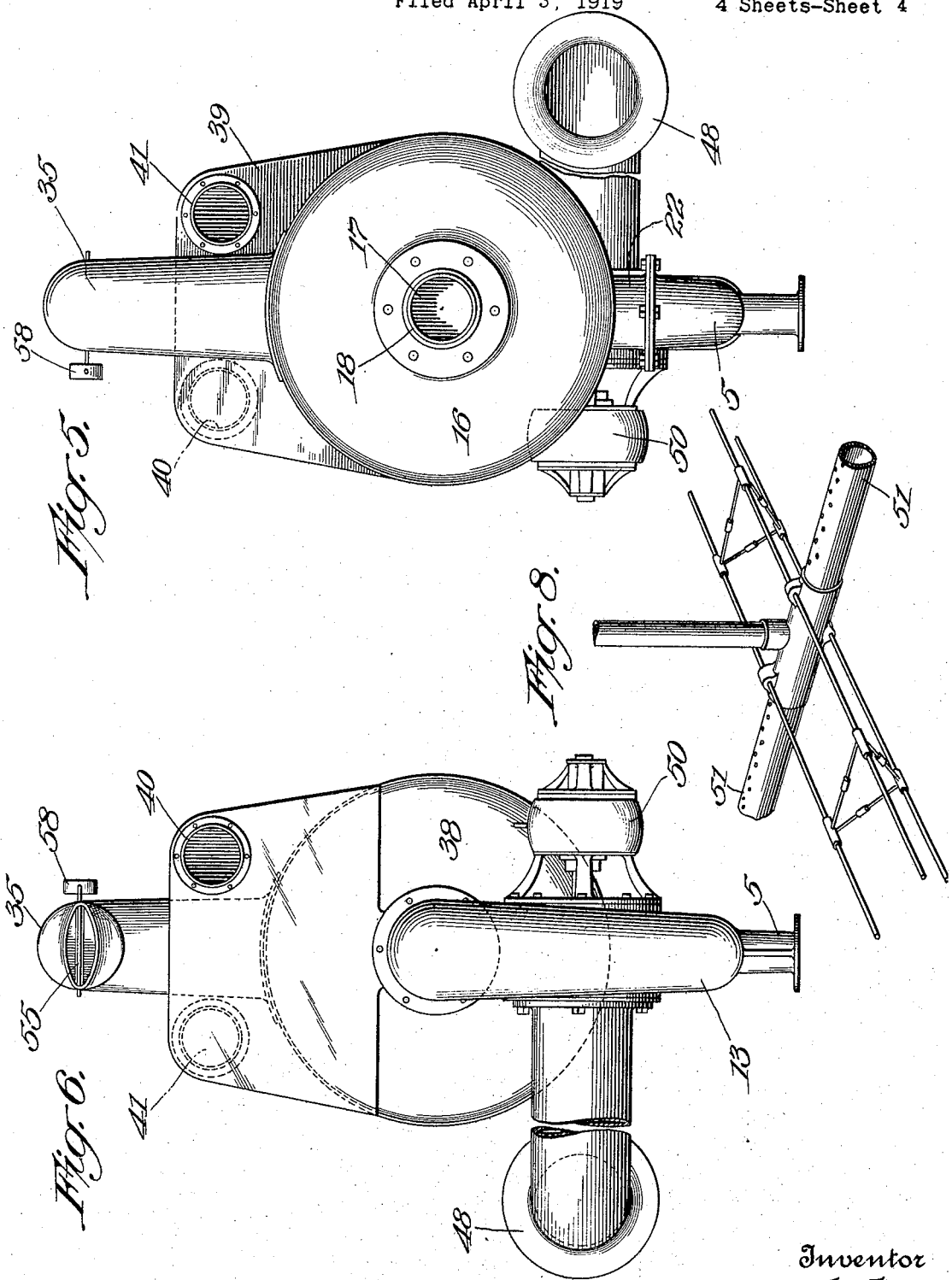

Patented May 27, 1924.

1,495,897

UNITED STATES PATENT OFFICE.

THOMAS M. FINLEY, OF ST. LOUIS, MISSOURI.

HEATING SYSTEM FOR FLYING MACHINES.

Application filed April 3, 1919. Serial No. 287,263.

*To all whom it may concern:*

Be it known that I, THOMAS M. FINLEY, a citizen of the United States, residing at St. Louis, in the county of St. Louis City and State of Missouri, have invented certain new and useful Improvements in Heating Systems for Flying Machines, of which the following is a specification.

The invention relates to a heating system for flying machines, and is a continuation in part of a co-pending application filed by me the 20th day of July, 1918, Serial Number 245,885.

The object of the present invention is to provide a simple, practical and efficient heating system adapted for utilizing the exhaust gases from the engines for supplying fresh heated air to the intervening space between the inner skin and the outer skin or covering of the body to produce a circulation of fresh air in such intervening space for carrying off seepage or other leakage of hydrogen gas, and thereby prevent dangerous explosive gas accumulations and also to maintain the desired temperature at the exterior surface of the body of the machine to prevent accumulation of snow and ice.

It is also an object of the invention to provide a heating system of this character adapted to maintain the hydrogen gas of the gas containers or envelopes at the desired temperature for obtaining the maximum lifting capacity of the said gas in various altitudes and prevent the cold of high altitudes from affecting the gas efficiency.

Another object of the invention is to provide a heating system equipped with a regenerator or heater adapted to receive the exhaust gases from the engines and fresh air from a blower or other source of supply and capable of effectively heating the air and regulation to supply the heated air at the temperature necessary to satisfy the heating requirements of the machine.

Another object of the invention is to provide a regenerator or heater having adjustable controlling means for retaining the heat of the exhaust of the engines and maintaining the required pressure within it to produce a uniform heating of the air with an irregular or intermittent operation of the engines so that in event of the stopping of the engines there will be no liability of the exhaust gases escaping entirely from the regenerator or heater and permitting a sudden reduction in the temperature of the fresh heated air supplied to the intervening space between the inner skin and the outer skin or covering of the body.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of construction, within the scope of the claims, may be resorted to without departing from the spirit or sacrificing any of the advantages of the invention.

In the drawings:—

Figure 1 is a transverse sectional view of a flying machine provided with a heating system constructed in accordance with this invention.

Figure 2 is an enlarged longitudinal sectional view through one of the cabins illustrating the arrangement of the means for supplying the fresh air and the means for heating the same.

Figure 3 is a plan view of the same.

Figure 4 is an enlarged plan view of the heater or regenerator.

Figure 5 is a front elevation of the same.

Figure 6 is a rear elevation of the heater or regenerator.

Figure 7 is a longitudinal sectional view of the same.

Figure 8 is a detail view of a portion of the heat distributing tube.

Like numerals of reference designate corresponding parts in the several views of the drawings.

In the accompanying drawings, in which is illustrated the preferred embodiment of the invention, the heating system which is designed primarily for supplying fresh heated air to the intervening space 1 between the outer skin or covering 2 and the inner skin 3 of the body of the flying machine shown and described in the aforesaid application, comprises in its construction a regenerator or heater 4 adapted to receive the exhaust gases from the exhaust manifold 5 of the generator engine 6 and also the exhaust from the propeller engine 7. The heater 4, which is located within the cabin 8 is of a substantially cylindrical form and it comprises an outer cylindrical shell or casing 9 and a plurality of concentric interiorly arranged shells 10, 11 and 12 which are arranged in spaced relation with one another to form laterally arranged intervening exhaust and fresh air passages so that the fresh air which is introduced into the heater by means of the blower 13 will be thoroughly subjected to the action of the hot gases of the exhaust and heated to a varying degree regulated by the speed of the blower, in passing through the regenerator or heater. The heater is provided at the front or exhaust inlet end with an exhaust inlet chamber 14 formed by a transverse partition 15 arranged in spaced relation with the front end wall 16 of the outer shell or casing of the heater. The front end wall 16 is provided with a central inlet opening 17 and is connected by a flexible steel tube 18 with the exhaust manifold 19 of the propeller engine and the said exhaust manifold 5 of the generator engine is connected with a bottom inlet opening 20 of the exhaust inlet chamber 14 as clearly shown in Figure 7 of the drawings. The heater is preferably supported adjacent its rear end at 21 upon the exhaust manifold 5 at one end thereof and the outlet end of the same is connected by a suitable cable 22 with the said bottom opening 20. The exhaust gases from both of the said engines enter the heater at the inlet chamber 14 and they travel through a central tube or reduced shell 23 which is arranged concentric with the said interior shells 10, 11 and 12 to form an intervening annular space or passage between it and the shell 12. The exhaust gases pass from the rear end of the central tube 23 and enter the intervening annular space or passage 24 between the shells 11 and 12 and pass around the rear end of the intervening space or passage 25 between the shell 12 and the central tube 23. The annular space or passage formed by the central tube and the shell 12 is closed at the rear end of the exhaust gases by means of a ring or annular closure member 26. The ring or annular closure member 26 is provided with a plurality of openings and is connected thereat with short air tubes 27 which connect the annular space or passage 25 with a fresh air inlet chamber 28 located at the rear end of the heater arranged in spaced relation with the rear end of the central tube and the rear end of the shell 12 to provide a space or chamber 29 for connecting the central exhaust tube 23 with the exhaust passage 24.

The exhaust gases travel forwardly in the annular space or passage 24 and pass around the front end of the annular air space or passage 30 which is closed at the front end to the exhaust gases by a ring or an engine closure member 31 having openings to receive the inner ends of short air tubes 32 which connect the annular air space or passage 30 with a chamber 33 formed by the transverse partition 15 and a partition 34 extending from the outer shell or casing to the inner shell or casing 12 which has its front end arranged in spaced relation with the partition 15. The intervening air space between the inner tube 23 and the shell 12 communicates with the connecting air chamber 32 and the air entering the said space 23 through the short rear tubes 27 passes around the exhaust space or passage 24 and passes from the chamber 33 through the said tubes 32 into the annular air space or passage 30. The exhaust gases leaving the heater through an approximately L-shaped exhaust outlet 35 located above the cabin and adapted to siphon the exhaust gases from the heater. The rear end of the exhaust space or passage 36 between the outer shell or casing and the concentric shell or casing 10 is closed at the rear end to the fresh air by means of an annular closure member or ring 37 preferably flanged, as shown and located in spaced relation with the rear end 38 of the outer shell or casing to provide an end air outlet chamber communicating with the rear end of the annular air passage 30 throughout the entire area of the rear end of the same. The heater is provided at the rear end with a cap or hood 39 extending above the said casing and forming an enlarged outlet or coupling member with which are connected oppositely upwardly projecting hot air tubes 40 and 41 extending along the interior of the cabin at the top thereof and preferably at one side of the same and having terminal transversely disposed arms 42 and 43 which are connected with transverse thermos tubes 44 formed by members of the tubular frame work of the flying machine, as set forth in the aforesaid application.

The blower 13 which is preferably mounted upon the rear end of the cylindrical casing of the heater by means of the suitable bracket 45 is connected by a coupling sleeve or member 46 with the rear end wall 38 and with the air inlet chamber 28, the said end wall 38 being provided with a centrally arranged opening for the passage of the air from the blower. The air enters the blower at one side of the blower casing centrally thereof by means of an air intake 47 having a flaring angularly disposed terminal portion 48 located at one side of the cabin at the top thereof, as clearly shown in Figure 3 of the drawings. An electric motor 50 which is located at the opposite side of the blower casing is connected with the blower and is adapted to actuate the latter. Any other form of motor or actuating means may of course be employed and any other suitable means for supplying fresh air to the heater may be used. The blower is equipped with a suitable valve 55 which is adapted to be adjusted to regulate the amount of air taken in by the blower and this adjustment of the blower with the control of the speed of the fan will vary the volume of air passing through the heater and the length of time such volume of air is permitted to remain in contact with the heated surfaces of the heater so that the temperature of the air leaving the heater may be regulated to satisfy the requirements of the flying machine. The air passing through the heater as taken from the interior of the cabin may of course be taken wholly or partially from the interior thereof if desired and the heated air introduced into the intervening space between the inner skin and the outer skin or covering of the body at the bottom of the wings through the thermos tubes and the longitudinal connecting tube 51 of the frame work as explained in the aforesaid application will rise in the said intervening space and pass upwardly at the inner and outer sides of the wings and will escape from the top of the body through siphon outlets 52. It will be noted that the circulation results from the operation of the three following features:

First: The blower forces the air through the heater and the tubes connecting the heater with the marginal air space of the body produce a pressure tending to force the air contained in the said space out at the top.

Second: The heated air being introduced at the bottom of the wings naturally tends to rise to the top of the body and escape at the top outlets.

Third: The siphon outlets 52 operate to draw the air from the intervening space between the inner skin and the outer covering by suction due to the forward progress of the flying machine. It will thus be seen that a perfect circulation of air through the said marginal air space is assured and that all liability of accumulation of dangerous explosive gaseous mixtures is eliminated and the temperature of the interior of the machine is maintained sufficiently high to prevent accumulation of snow and ice when the machine is in high altitudes. Furthermore, the heating of the air circulating in the marginal air space will expand such air and make the same more nearly approaching the density of any hydrogen gas in the said space and such air and gas will pass off in the circulation through such space with a minimum tendency to the formation of dangerous explosive mixtures through diffusion.

The thermos tubes may be of any desired construction but preferably consist of an outer tube and an inner tube 53 arranged in spaced relation with the outer tube to provide a vacuum space between the tubes. Any other suitable means may of course be employed for protecting the hot air tubes to prevent the temperature of the air passing through the tube from being reduced by the external atmosphere. The circulation of a sheet of heated air around the gas containers will maintain the hydrogen gas at a maximum, carrying or lifting efficiency and as the hydrogen gas compression chambers 54 described in the aforesaid application are located at the bottom of the wings it will be apparent that by pumping the hydrogen gas through the said compression chambers back into the gas containers such circulation of the hydrogen gas will enable the same to be heated and maintained at a relatively high temperature should it be desirable to utilize such heating means when the machine is in high altitudes or other conditions such as winter or the use of the machine in cold altitudes In order to retain the heat within the heater and maintain a predetermined pressure of the exhaust gases within the same, the exhaust outlet is provided with a valve 55 pivoted at 56 at one side of the outlet and provided with an exteriorly arranged arm 57 having an adjustable weight 58 adapted to be moved inwardly and outwardly to vary the pressure with which the valve is maintained in its closed position. The valve operates as a balance valve, the valve portion being heavier than the weighted arm, but any other form of valve and pressure controlling means may of course be employed. The valve will retain the exhaust gases within the heater until the pressure therein is sufficient to overcome the weight or pressure of the valve and when the pressure of the gas within the heater is sufficient it will open the valve and escape through the siphon outlet. The siphon outlet consists of a vertical portion and a horizontal portion and the valve is shown mounted in the vertical portion. The provision of the valve inner outlet will maintain the heater in the heated condition with an irregular or intermittent operation of the engines should such be desirable as it will be impossible for the gas to escape entirely from the heater when the engines cease their operation and there will be no liability of the air delivered to the air circulation space being suddenly chilled.

What is claimed is:—

1. A flying machine including a body having an outer skin or covering and an inner skin containing a gas and spaced from the outer skin or covering to form an intervening air space substantially enveloping the gas within the inner skin, a frame-work having a tubular member communicating with the said intervening air space, and means located exteriorly of the said body and communicating with the tubular member for delivering air to the said air space at a temperature for controlling the temperature of the gas within the inner skin.

2. A flying machine including a body provided at the bottom with spaced portions or wings and having a frame work provided with tubular members communicating with the body at the bottom of the said portions or wings for supplying the body with heated air. and means for heating the air and delivering the same to the tubular members.

3. A flying machine including a body provided with spaced bottom portions or wings and provided also with a frame-work having tubular members extending across the space between the wings or bottom portions and communicating with the body thereat to supply the body with heated air, and heating means for supplying the tubular members with heated air.

4. A flying machine including a body having an air circulating space and provided with a frame work having tubular members extending longitudinally and transversely of the body and communicating with the air circulating space for supplying heated air to the same to control the temperature within the body, and means for heating air and for supplying the same to the tubular members.

5. A flying machine including a body having an air circulating space and provided with spaced bottom portions or wings, said body being also provided with a framework having tubular members arranged longitudinally and transversely of the body at the bottom thereof, the longitudinal members extending along the bottom portions or wings and the transverse tubular members extending across the space between the tubular portions or wings and connecting the longitudinal members, the latter communicating with the body for supplying heated air to the air circulating space, and means for supplying heated air to the tubular members.

6. A flying machine including a body having an inner skin and an outer skin or covering spaced from the inner skin to form an intervening air space, said body being also provided at the bottom with spaced portions or wings, a frame-work supporting the body and provided with tubular members extending longitudinally of the bottom portions or wings for supplying heated air to the circulating space, said tubular members having outlets communicating with the said space, and means for supplying the tubular members with heated air to control the temperature within the body.

7. A flying machine including a body having a frame work and provided with an inner skin and an outer skin or covering spaced apart to provide an intervening air circulation space, said frame work having tubular members communicating with the said air circulation space, a heater having an air passage communicating with the said tubular members and means for supplying air to the said heater.

8. A flying machine including a body having a frame work and provided with an inner skin and an outer skin or covering spaced apart to provide an intervening air circulation space, said frame work having tubular members communicating with the said air circulation space, a heater having an air passage communicating with the said tubular members, a blower connected with the air passage of the heater and means for operating the blower.

9. A flying machine including a body having a frame work and provided with an inner skin and an outer skin or covering spaced apart to provide an intervening air circulation space, said frame work having tubular members communicating with the said air circulation space, a heater having air passages and exhaust gas passages, means for connecting the air passages with the tubular members of the frame work and means for connecting the exhaust gas passages of the heater with the exhaust of an engine.

10. In a flying machine the combination of a body having an inner skin and an outer covering forming an intervening air circulation space, an engine having an exhaust manifold, a heater having air and exhaust gas passages, means for connecting the exhaust gas passage with the exhaust manifold of an engine, a valve having an adjustable controlling weight and adapted to maintain a predetermined pressure of gas within the heater, and means for connecting the air passage of the heater with the air circulation space in the body.

In testimony whereof I affix my signature.

THOMAS M. FINLEY.